(12) United States Patent
Raith et al.

(10) Patent No.: US 8,919,078 B2
(45) Date of Patent: Dec. 30, 2014

(54) DEVICE AND METHOD FOR CONTROLLING A BOTTLING PLANT

(75) Inventors: Stefan Raith, Pfatter (DE); Johann Lehner, Bach (DE); Michael Aufhauser, Gebelkofen (DE)

(73) Assignee: Krones AG, Neutraubling (DE)

( * ) Notice: Subject to any disclaimer, the term of this patent is extended or adjusted under 35 U.S.C. 154(b) by 961 days.

(21) Appl. No.: 13/046,987

(22) Filed: Mar. 14, 2011

(65) Prior Publication Data
US 2011/0226381 A1 Sep. 22, 2011

(30) Foreign Application Priority Data

Mar. 19, 2010 (DE) .......................... 10 2010 003 078

(51) Int. Cl.
*B67C 3/02* (2006.01)
*B67C 3/22* (2006.01)
*B29C 49/42* (2006.01)
*B67C 3/00* (2006.01)

(52) U.S. Cl.
CPC .... *B67C 3/02* (2013.01); *B67C 3/22* (2013.01); *B29C 49/42* (2013.01); *B67C 3/007* (2013.01)
USPC ........ 53/396; 53/452; 53/471; 53/55; 53/559; 53/281; 141/1; 141/98

(58) Field of Classification Search
CPC .............. B67C 3/007; B67C 2003/227; B67C 2003/00; B67C 2003/02; B67C 2003/22; B67C 3/02; B67C 3/22; B67C 7/00; B29C 49/78; B29C 49/4236; B65B 57/02; B65B 57/08; G05B 2219/45048; G05B 2219/34306; G05B 2219/32021; G05B 2219/25387

USPC ........ 53/396, 452, 471, 55–58, 505, 67, 559, 53/561, 281, 282; 141/1, 98; 425/136
See application file for complete search history.

(56) References Cited

U.S. PATENT DOCUMENTS

| 3,789,889 | A  | * | 2/1974 | Riedel et al. .................. 141/140 |
| 4,506,144 | A  | * | 3/1985 | Hesford et al. ............... 219/497 |
| 7,343,353 | B1 | * | 3/2008 | Wu et al. ....................... 705/400 |
| 7,568,905 | B2 | * | 8/2009 | Cooke ........................... 425/504 |
| 8,272,495 | B2 | * | 9/2012 | Zech ......................... 198/341.01 |

(Continued)

FOREIGN PATENT DOCUMENTS

| DE | 966169 C | 7/1957 |
| DE | 1158856 B | * 12/1963 ............. B67C 3/007 |

(Continued)

OTHER PUBLICATIONS

German Search Report for corresponding application No. 10 2010 003 078, mailed Jul. 27, 2010, 4 pages.

*Primary Examiner* — Stephen F Gerrity
(74) *Attorney, Agent, or Firm* — Marshall, Gerstein & Borun LLP

(57) ABSTRACT

A method of controlling a bottling plant, including detecting an operating state of the bottling plant, determining whether for the detected operating state the energy consumption and/or the consumable consumption of at least one consumer of the bottling plant can be reduced, and if it is determined that the energy consumption and/or the consumable consumption of at least one consumer can be reduced, reducing the energy consumption and/or the consumable consumption of the at least one consumer.

10 Claims, 2 Drawing Sheets

(56) References Cited

U.S. PATENT DOCUMENTS

| | | | |
|---|---|---|---|
| 8,356,455 B2 * | 1/2013 | Sato et al. | 53/58 |
| 8,362,655 B2 * | 1/2013 | Landgraf et al. | 307/116 |
| 2004/0073404 A1 * | 4/2004 | Brooks et al. | 702/183 |
| 2004/0122545 A1 * | 6/2004 | Akiyama et al. | 700/99 |
| 2004/0168411 A1 * | 9/2004 | Christman et al. | 53/557 |
| 2008/0319571 A1 * | 12/2008 | Voth et al. | 700/197 |
| 2009/0104304 A1 * | 4/2009 | Christiansen | 425/526 |
| 2010/0094448 A1 * | 4/2010 | Tomine | 700/108 |
| 2010/0138076 A1 * | 6/2010 | Tomine | 700/306 |
| 2010/0324723 A1 * | 12/2010 | Zech | 700/223 |
| 2011/0260372 A1 * | 10/2011 | Hahn | 264/500 |

FOREIGN PATENT DOCUMENTS

| | | | | |
|---|---|---|---|---|
| DE | 2107226 A1 | * | 9/1972 | B65B 57/02 |
| DE | 2122152 A1 | | 11/1972 | |
| DE | 3823032 A1 | | 1/1990 | |
| DE | 4417780 A1 | | 11/1995 | |
| DE | 102004062239 A1 | | 7/2006 | |
| DE | 202008013072 U1 | | 1/2009 | |
| EP | 1972877 A2 | | 9/2008 | |
| GB | 1453468 A | * | 10/1976 | B29C 49/063 |
| JP | 2000127236 A | * | 5/2000 | B29C 49/78 |
| WO | WO 2009138347 A1 | * | 11/2009 | G05B 19/042 |
| WO | WO 2009146723 A2 | * | 12/2009 | G05B 2219/25387 |

* cited by examiner

DEVICE AND METHOD FOR CONTROLLING A BOTTLING PLANT

CROSS-REFERENCE TO RELATED APPLICATION

The present application claims the benefit of priority of German Application No. 102010003078.3, filed Mar. 19, 2011. The entire text of the priority application is incorporated herein by reference in its entirety.

FIELD OF THE DISCLOSURE

The present disclosure relates to a method and a device for controlling a bottling plant, in particular in the food or beverage industry.

BACKGROUND

In a bottling plant, despite an extended production standstill, for example caused by retrofitting or cleaning operations, normally all consumers are continued to be operated and supplied with energy and/or consumables.

This is to ensure that after the production interruption, all functions of the bottling plant will be immediately available in the further operation.

This well-known procedure, however, has a disadvantage in that it gives rise to high consumption of energy and/or consumables.

SUMMARY OF THE DISCLOSURE

It is therefore one aspect of the present disclosure to provide a method which permits an energy-efficient and/or consumable-efficient operation of a bottling plant.

The method according to the disclosure of controlling a bottling plant comprises the steps of:

detecting an operating state of the bottling plant, determining whether for the detected operating state, the energy consumption and/or the consumable consumption of at least one consumer of the bottling plant can be reduced, and if it is determined that the energy consumption and/or consumable consumption of at least one consumer can be reduced, reducing the energy consumption and/or consumable consumption of the at least one consumer.

By reducing the energy consumption and/or the consumable consumption of at least one consumer of the bottling plant depending on a detected operating state of the bottling plant, the bottling plant can be operated in an energy-efficient and/or consumable-efficient manner.

That means the energy consumption and/or the consumable consumption of one or several consumers of the bottling plant can be reduced in relation to the operating procedure.

The bottling plant can comprise processing elements for filling containers, in particular with a liquid. The bottling plant can moreover comprise treatment elements for manufacturing and/or treating the containers. For example, the bottling plant can comprise a blow molding machine for manufacturing plastic containers, a sterilization means, a labeling means, and/or a closing means for closing the filled containers with a closure. The bottling plant can moreover comprise a commissioning device for commissioning the filled containers, for example to a pallet, a packer and/or at least one conveying device for conveying and/or stowing the containers.

The at least one consumer of the bottling plant can correspond to a treatment means or an element of a treatment means of the bottling plant. The at least one consumer of the bottling plant can also correspond to a ventilation device, an illumination device, an air conditioning device, in particular for room air and/or for one or several switch cabinets, a compressor for compressed air generation, a heating means, in particular for a shrink tunnel at a packer or for preform heating in a blow molding machine, and/or a sterilization means, in particular at a filler.

Consumables can correspond to media which are consumed in the operation of the bottling plant by material utilization. Consumables in the sense of the application can in particular comprise compressed air, superheated steam and hot water, sterile steam, sterilization means, water and/or cleansing agents.

As energy, one can in particular denote electric energy.

The reduction of energy consumption and/or consumable consumption can in particular correspond to switching off the at least one consumer. As an alternative, the reduction of energy consumption can correspond to putting the at least one consumer in a non-operative state (stand-by state).

As an alternative or in addition, reducing the energy consumption of the at least one consumer can correspond to reducing the performance of the at least one consumer. This can be done, for example, by reducing the load of the at least one consumer.

The energy consumption and/or the consumable consumption of the at least one consumer can be reduced in particular in case of a production interruption. In this case, the detection of an operating state can comprise the detection of a production interruption or a production standstill, or correspond to the detection of a production interruption or a production standstill. The detected operating state can in this case correspond to a detected production interruption or a detected production standstill, respectively.

A production interruption can be in particular caused by retrofitting or cleaning operations. A production interruption can also be due to operating conditions, for example at weekends or outside the provided working hours, for example at night. A production interruption can also occur during maintenance and/or servicing works, and/or during repair works, for example in case of a defect, in particular when components fail.

The detection of an operating state of a bottling plant can in particular comprise a detection of the operating state of the consumers of the bottling plant. For example, the detection for one or several consumers can comprise the detection whether articles, in particular containers, are processed in the consumers.

For example, a plant can comprise several machines for one task, for example two labeling means. The detection of an operating state can in this case comprise the detection whether redundant or multiply provided machines/components are required for the production.

The detection of an operating state of the bottling plant can comprise the detection of at least one operating parameter and/or at least one operating setting of one or several, in particular all, consumers of the bottling plant.

The detection of an operating state can, as an alternative or in addition, comprise the detection of the energy consumption of at least one consumer of the bottling plant, in particular all consumers of the bottling plant.

As an alternative or in addition, the detection of the operating state can comprise a detection of an input by an operator. For example, via a control unit, an operator can select an operating state, in particular concerning an imminent production interruption, where the reduction of the energy consumption and/or the consumable consumption of the at least one consumer is carried out on the basis of the operating state selected by the operator.

The energy consumption and/or the consumable consumption can be reduced for a predetermined period. The predetermined period can in particular be selected or determined depending on the detected operating state. In particular, in case of a production interruption, a reason or a cause for the production interruption can be detected, where the predetermined period is determined based on the detected reason.

The detection of a reason for a production interruption can be accomplished in particular on the basis of an input by an operator. By a reason for a production interruption being detected, the period during which the energy consumption and/or consumable consumption of the at least one consumer is reduced can be optimized. For example, before the end of the production interruption, in particular after the predetermined time has lapsed, the energy consumption and/or the consumable consumption of the at least one consumer can be increased again. By this, one can ensure that the consumer is immediately available in the further operation after the production interruption.

The energy consumption and/or the consumable consumption of the at least one consumer can be reduced independent of other consumers of the bottling plant. For example, the energy consumption and/or the consumable consumption of the at least one consumer can be reduced, while the energy consumption and/or the consumable consumption of other consumers is maintained without changes. In particular, consumers which would need a long time to be operative again after a reduction of the energy and/or consumable consumption could be further operated even in case of a production interruption, in particular without reducing the energy consumption and/or the consumable consumption.

Moreover, at least one ambient parameter of the bottling plant can be measured, where the reduction of the energy consumption and/or the consumable consumption of the at least one consumer can be based on the at least one measured ambient parameter. Thereby, the energy consumption and/or the consumable consumption of the bottling plant, in particular of the consumer, can be adapted to ambient parameters. The at least one ambient parameter can correspond, for example, to a temperature or air humidity.

The energy consumption and/or the consumable consumption of the at least one consumer can be increased again after a predetermined time. It can thereby be ensured that the at least one consumer is available for further operation after a production interruption.

As an alternative, the increase of the energy consumption and/or the consumable consumption of the at least one consumer can also be accomplished depending on a detected operating state. For example, the energy consumption and/or the consumable consumption of the at least one consumer can be reduced after a first operating state has been detected, and increased again after a second operating state has been detected. The first operating state can in particular differ from the second operating state.

The determination whether for the detected operating state the energy consumption and/or the consumable consumption of at least one consumer of the bottling plant can be reduced can comprise an in particular automatic matching with at least one predetermined operating state. The at least one predetermined operating state can in particular be stored in a storage element together with a specification for a predetermined, in particular optimal, energy consumption and/or consumable consumption of at least one consumer in at least one predetermined operating state.

The detection of an operating state and the determination whether for the detected operating state the energy consumption and/or the consumable consumption of at least one consumer of the bottling plant can be reduced can be carried out several times, in particular repeatedly. Thereby, the bottling plant can be monitored for possible energy reductions and/or consumable consumption reductions. The two steps can be carried out in particular continuously, at predetermined points in time or at predetermined time intervals. As soon as it is determined that the energy consumption and/or the consumable consumption of at least one consumer of the bottling plant can be reduced, the energy consumption and/or the consumable consumption of the at least one consumer can be reduced.

One or several steps of the method can be carried out partially or completely automatically, for example by a control element of the bottling plant. In particular, all steps of the method can be carried out partially or completely automatically.

The disclosure moreover provides a bottling plant, comprising at least one consumer and one control element that is designed and/or configured to detect an operating state of the bottling plant, to determine whether the energy consumption and/or the consumable consumption of at least one consumer of the bottling plant can be reduced for the detected operating state and, if it is determined that the energy consumption and/or the consumable consumption of the at least one consumer can be reduced, to reduce the energy consumption and/or the consumable consumption of the at least one consumer.

Such a bottling plant can be operated in an energy-efficient and/or consumable-efficient manner.

The control element can in particular be designed and/or configured to carry out an above described method for controlling a bottling plant.

The control element can be a production management system (Manufacturing Execution System, MES).

The bottling plant can in particular comprise a blow molding machine, a filler, a labeling device, a closer, a packer, a cleaning machine, a pasteurizer, at least one transport device and/or a commissioning device.

The bottling plant, in particular the at least one consumer of the bottling plant, can be designed such that the energy consumption and/or the consumable consumption of the at least one consumer can be reduced independent of other consumers of the bottling plant.

BRIEF DESCRIPTION OF THE DRAWINGS

Further features and advantages of the disclosure will be described below with reference to the exemplary figures. In the drawings.

DETAILED DESCRIPTION OF THE PREFERRED EMBODIMENT

Figure 1:
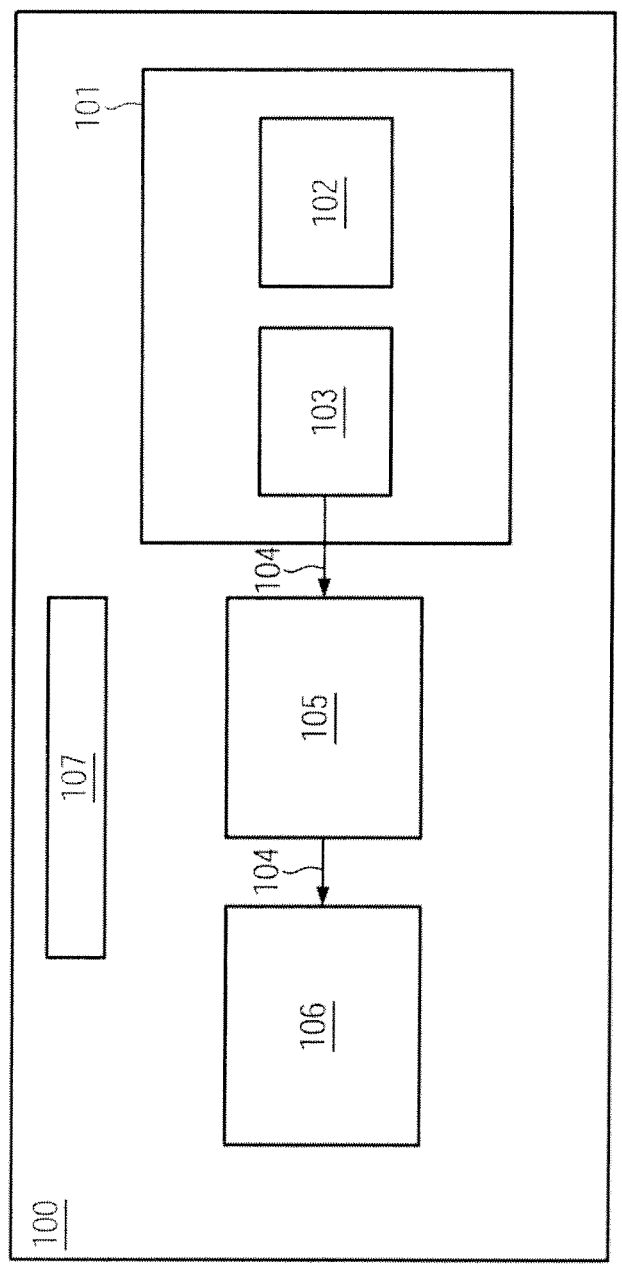
FIG. 1 shows an illustration of an exemplary bottling plant.

FIG. 1 shows an exemplary bottling plant 100, comprising several consumers. For example, the exemplary bottling plant 100 comprises a blow molding machine 101, which in turn comprises a heating element 102 for preheating the preforms and a blow molding wheel 103 for blow molding the heated preforms.

The exemplary bottling plant moreover comprises a filler 105 and a labeling device 106. Between the individual machines of the bottling plant 100, the articles are conveyed and/or stowed by transport devices 104.

Apart from the machines for treating the articles, in particular bottles, the exemplary bottling plant 100 moreover comprises a subsystem 107. The subsystem 107 can be, for example. an illumination system, an air conditioning device, a compressor for compressed air generation, a heating means and/or a ventilation system.

Apart from the consumers shown in FIG. 1 by way of example, the bottling plant 100 can alternatively or additionally comprise a sterilization device for sterilizing the produced articles, a rinser, a closer, a packer, and/or a commissioning device.

In operation, the consumers can consume energy, in particular electric energy, and/or consumables, for example water or cleansing agents. Water is consumed, for example, in a bottle cleaner in the fresh water rinse area, or in a pasteurizer for cooling the bottles to prevent over-pasteurization.

The exemplary bottling plant 100 moreover comprises a control element which is designed and/or configured such that it can control, in particular reduce, the energy consumption and/or the consumable consumption of at least one consumer of the bottling plant 100 depending on a detected operating state.

Figure 2:
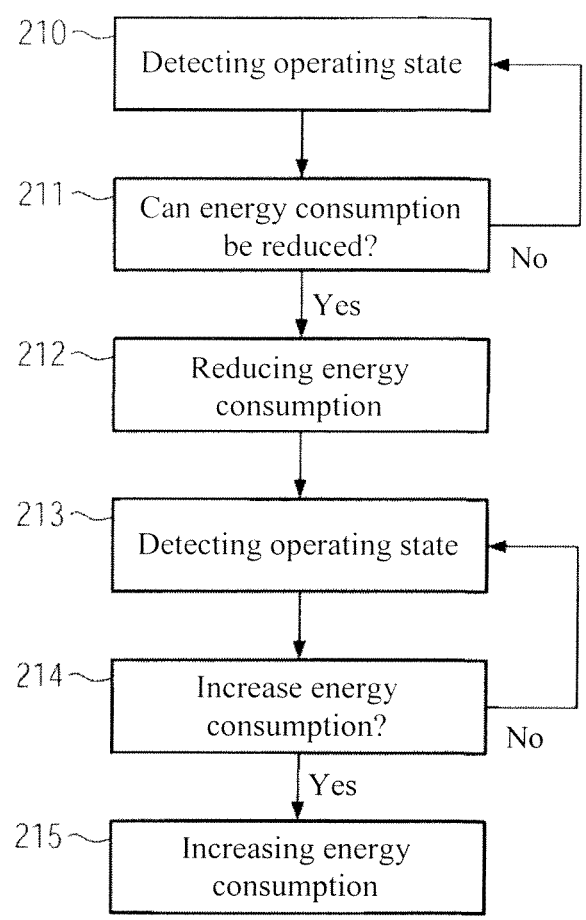
FIG. 2 shows an illustration of an exemplary method of controlling a bottling plant in the form of a flow chart.

In particular, the control element can carry out a method of controlling a bottling plant as illustrated in FIG. 2.

In particular, FIG. 2 shows an exemplary method of controlling a bottling plant in the form of a flow chart. In a first step 210, an operating state of the bottling plant is detected. The detection of an operating state of the bottling plant can comprise the detection of operating parameters and/or operating settings of one or several, in particular all consumers of the bottling plant. As an alternative or in addition, the detection of the operating state can comprise a detection of an input by an operator.

The detection of an operating state also comprises the detection of the energy consumption and/or the consumable consumption of at least one consumer of the bottling plant, in particular all consumers of the bottling plant. The detection of an operating state can in particular comprise the detection of a production interruption.

In a second step 211, it is determined whether for the detected operating state, the energy consumption and/or the consumable consumption of at least one consumer of the bottling plant can be reduced. For this, one or several predetermined operating states can be stored for example in a storage element of the control element of the bottling plant. In connection with one or several, in particular each, of the predetermined operating states, a specification of a predetermined, in particular optimal, in particular minimal, energy consumption and/or consumable consumption of one or several consumers of the bottling plant can be stored for the predetermined operating state.

Step 211 can in this case comprise comparing the detected operating state with the predetermined operating states. If the detected operating state corresponds to a predetermined operating state, the energy consumption and/or the consumable consumption of at least one consumer can be compared to the specified energy consumption and/or consumable consumption of the at least one consumer for the predetermined operating state. If the specified energy consumption and/or consumable consumption is lower than the energy consumption and/or consumable consumption of the at least one consumer in the detected operating state, the energy consumption and/or the consumable consumption of the at least one consumer can be reduced.

Step 211 can also comprise determining whether redundant or multiply provided consumers are simultaneously required for the detected operating state. If one or several ones of the redundant consumers for the detected operating state are not required, the energy consumption and/or consumable consumption of the one or the several redundant consumers can be reduced.

For example, a bottling plant can comprise two labeling means. If only one labeling means is used, for example because the performance of one labeling means is sufficient for the bottles to be produced, the energy consumption and/or the consumable consumption of the second labeling means can be reduced.

If it is determined that for no consumer of the bottling plant, the energy consumption can be reduced, the method returns to step 210 and detects an operating state of the bottling plant again.

If it is determined that the energy consumption and/or the consumable consumption of at least one consumer can be reduced, step 212 is carried out. In step 212, the energy consumption and/or the consumable consumption of the at least one consumer is reduced, in particular to the specified predetermined energy consumption and/or the consumable consumption for the predetermined operating state.

Step 212 can also comprise switching off the at least one consumer.

After a production interruption due to retrofitting or cleaning operations, the consumers of the bottling plant are to be available for further operation. Therefore, in step 213 of the exemplary method in FIG. 2, an operating state of the bottling plant is detected again. In particular, step 213 can be carried out analogously to step 210. In particular, the detection of an operating state in step 213 can comprise a detection of an end of a production interruption.

It is determined in step 214 whether for the detected operating state the energy consumption and/or the consumable consumption of at least one consumer must be reduced. If no, the method returns to step 213. If yes, the energy consumption and/or the consumable consumption of the at least one consumer is increased in step 215.

For example, a first operating state can be detected where no preforms are introduced into the blow molding machine. Thereupon, the energy consumption and/or the consumable consumption of a filler, a blow molding wheel, a labeling device, a closer, a packer, and/or a commissioning device of the bottling plant or of individual elements of it can be reduced. The energy consumption of a heating element of the blow molding machine can be, for example, maintained without changes, as it has a long warm-up time at the start of operation. If a second operating state is detected where again preforms are introduced into the blow molding machine, the energy consumption and/or the consumable consumption of the filler, the blow molding wheel, the labeling device, the closer, the packer, and/or the commissioning device of the bottling plant or of individual elements of it can be increased again.

In step 214, it can also be determined whether the energy consumption and/or the consumable consumption of at least one consumer of the bottling plant can be reduced again. If yes, the method can return to step 212 and reduce the energy consumption and/or the consumable consumption of at least one consumer.

After step 215, the method can return o step 210 and further monitor the operating state of the bottling plant.

Instead of a complete treatment unit of the bottling plant, the at least one consumer can also correspond to an element of a treatment unit, for example a fan of a treatment unit. The fan in the switch cabinet of a treatment unit can be cabled separately after a main switch, for example with a relay, and can be switched off separately. Switching off can be carried out manually, automatically via a production management system (Manufacturing Execution System, MES), or via WEAN.

The detection of an operating state can also comprise receiving an order of the production management system. For example, the MES can send an order for retrofitting to the bottling plant. Thereupon, at least one consumer can be selectively switched off for the duration of retrofitting works.

The detection of an operating state can also comprise measuring a temperature and/or air humidity. The reduction of the energy consumption and/or consumable consumption of at least one consumer can be carried out depending on the measured temperature and/or air humidity. For example, the performance of an air conditioning system can be controlled, in particular reduced, depending on the measured ambient temperature. The performance of a drier, for example upstream of a labeling means, can be controlled, in particular reduced, depending on the measured ambient temperature and/or air humidity.

It will be understood that features mentioned in the above described embodiments are not restricted to these special combinations and are also possible in any other combinations.

What is claimed is:

1. Method of controlling a bottling plant, comprising:
   detecting an operating state of the bottling plant comprising the detection of at least one of an energy consumption or a consumable consumption of at least one consumer of the bottling plant:
   determining whether for the detected operating state the at least one of the energy consumption or the consumable consumption of the at least one consumer of the bottling plant can be reduced; and
   if it is determined that the at least one of the energy consumption or the consumable consumption of at least one consumer can be reduced,
   reducing at least one of the energy consumption or the consumable consumption of the at least one consumer;
   wherein determining whether for the detected operating state the one of the energy consumption or the consumable consumption of the at least one consumer of the bottling plant can be reduced comprises automatically matching at least one predetermined operating state stored in a storage element together with a specification for at least one of an optimal energy consumption or consumable consumption of the at least one consumer in the at least one predetermined operating state.

2. Method according to claim 1, and the reducing at least one of the energy consumption or the consumable consumption of the at least one consumer upon a production interruption.

3. Method according to claim 1, wherein the detecting the operating state comprises detecting an input by an operator.

4. Method according to claim 1, and wherein the reducing at least one of the energy consumption or the consumable consumption is for a predetermined period.

5. Method according to claim 4, wherein in case of a production interruption, detecting a reason for the production interruption, and wherein the predetermined period is determined based on the detected reason.

6. Method according to claim 1, wherein the reducing at least one of the energy consumption or the consumable consumption of the at least one consumer is independent of other consumers of the bottling plant.

7. Method according to claim 1, and switching off the at least one consumer in case of a production interruption.

8. Method according to claim 1, and measuring at least one ambient parameter of the bottling plant, and wherein the reduction of at least one of the energy consumption or the consumable consumption of the at least one consumer is based on at least one measured ambient parameter.

9. Method according to claim 1, and increasing again at least one of the energy consumption or the consumable consumption of the at least one consumer after a predetermined time.

10. Bottling plant, comprising:
    at least one consumer; and
    a control element, which is configured to:
    detect an operating state of the bottling plant comprising the detection of at least one of an energy consumption or a consumable consumption of at least one consumer of the bottling plant:
    determine whether for the detected operating state, the at least one of the energy consumption or the consumable consumption of the at least one consumer of the bottling plant can be reduced; and
    reducing the at least one of the energy consumption or the consumable consumption of the at least one consumer if it is determined that the energy consumption and/or the consumable consumption of the at least one consumer can be reduced;
    wherein being configured to determine whether for the detected operating state the at least one of the energy consumption or the consumption of the at least one consumer of the bottling plant can be reduced comprises including an automatic matching at least one predetermined operating state stored in a storage element together with a specification for one of an optimal energy consumption or consumable consumption of the at least one consumer in the at least one predetermined operating state.

* * * * *